United States Patent
Zhao

(10) Patent No.: US 7,764,384 B1
(45) Date of Patent: Jul. 27, 2010

(54) SWEPT FREQUENCY LASER METROLOGY SYSTEM

(75) Inventor: Feng Zhao, Arcadia, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 277 days.

(21) Appl. No.: 11/924,766

(22) Filed: Oct. 26, 2007

Related U.S. Application Data

(60) Provisional application No. 60/859,554, filed on Nov. 16, 2006.

(51) Int. Cl.
*G01B 9/02* (2006.01)
(52) U.S. Cl. .................................................. 356/486
(58) Field of Classification Search ................ 356/486, 356/498

See application file for complete search history.

(56) References Cited

OTHER PUBLICATIONS

O.P. Lay, S. Dubovitsky, R.D. Peters and J,P. Burger, "MSTAR: a submircometer absolute metrology system", Opt. Lett., vol. 28, pp. 890-892, 2003.

F. Zhao, "Development of high precision laser heterodyne metrology gauges", Proc. SPIE, vol. 5634, pp. 247-259, 2005.

K.-H. Bechstein and W. Fuchs, "Absolute interferometric distance measurements applying a variable synthetic wavelength", J. Opt., vol. 29, pp. 179-182, 1998.

*Primary Examiner*—Tarifur Chowdhury
*Assistant Examiner*—Jonathon D Cook
(74) *Attorney, Agent, or Firm*—Mark Homer

(57) ABSTRACT

A swept frequency laser ranging system having sub-micron accuracy that employs multiple common-path heterodyne interferometers, one coupled to a calibrated delay-line for use as an absolute reference for the ranging system. An exemplary embodiment uses two laser heterodyne interferometers to create two laser beams at two different frequencies to measure distance and motions of target(s). Heterodyne fringes generated from reflections off a reference fiducial $X_R$ and measurement (or target) fiducial $X_M$ are reflected back and are then detected by photodiodes. The measured phase changes $\Delta\phi_R$ and $\Delta\phi_m$ resulting from the laser frequency swept gives target position. The reference delay-line is the only absolute reference needed in the metrology system and this provides an ultra-stable reference and simple/economical system.

4 Claims, 4 Drawing Sheets

SWEPT FREQUENCY LASER METROLOGY SYSTEM

CROSS-REFERENCE TO RELATED APPLICATION(S)

The present application derives priority from U.S. provisional application Ser. No. 60/859,554, filed 16 Nov. 2006.

STATEMENT OF GOVERNMENT INTEREST

The invention described hereunder was made in the performance of work under a NASA contract, and is subject to the provisions of Public Law #96-517 (35 U.S.C. 202) in which the Contractor has elected not to retain title.

BACKGROUND OF THE INVENTION

1. Field of the Invention

The present invention generally relates to precision coordinate measurement systems for positioning, pointing control and vibration cancellation and, more particularly, to a laser metrology system capable of providing real-time platform motion information at high precision and accuracy.

2. Description of Prior Art

Various applications require exacting coordinate control of equipment. For example, in the space industry there is a need for precision control of spacecraft and payloads. In the particular space context, liquid-filled inclinometers cannot be used due to their gravity and temperature dependence and limited resolution, and eddy current sensors are undesirable due to electromagnetic compatibility with the rest of the spacecraft.

Another application is astronomical inteferomtry. An astronomical interferometer is an array of controlled-position telescopes or mirror segments acting together to resolve at a higher resolution. Astronomical interferometers are widely used for optical astronomy, infrared astronomy, submillimetre astronomy and radio astronomy.

Optical (laser) metrology is an excellent Sensor option for the foregoing applications because it has excellent resolution. Laser metrology systems that can measure both absolute distance and displacement have broad applications ranging from coordinate measuring machines to deployable structures. Indeed, laser metrology systems have become a key component of space craft and, payload positioning systems, and of stellar interferometers where they are used to monitor path lengths and dimensions internal to the instrument.

As an example, the MSTAR sensor (Modulation Sideband Technology for Absolute Ranging) is an existing NASA system for measuring absolute distance, capable of resolving the integer cycle ambiguity of standard interferometers, and making it possible to measure distance with sub-nanometer accuracy. The design of this system is described by Lay et al., "MSTAR: An Absolute Metrology System With Submicrometer Accuracy"; New Frontiers in Stellar Interferometry, Proceedings of SPIE Volume 5491, p.1068 (October 2004). MSTAR is a general-purpose tool for conveniently measuring length to micron-absolute and sub-nm displacement, and has a wide range of possible applications.

Unfortunately, MSTAR and Other known laser metrology systems are relatively complicated, use more hardware (acousto-optic modulators, phase modulators, etc.), require stabilized lasers, and place tight tolerance limits on the optics and electronics. In addition, frequency sources must be calibrated and stabilized, and still there is a large degree of ambiguity of measurement.

Accordingly, it would be greatly advantageous to employ a swept frequency laser source and a calibrated reference cavity to measure unknown distance by comparison with the reference cavity. This approach would provide a far simpler laer metrology with reduced hardware overhead, reduced claibration and stabilization requirements, and reduced ambiguity of measurement.

SUMMARY OF THE INVENTION

It is a primary object of this invention to provide an improved laser ranging system with sub-micron accuracy.

It is another object to provide a swept frequency laser metrology system that employs common-path heterodyne interferometers with a calibrated delay-line used as an absolute reference for the system.

It is another object to provide a swept frequency laser metrology system capable of absolute ranging measurement and displacement measurement, with no ambiguity in absolute ranging.

It is another object to provide a swept frequency laser metrology system with a calibrated delay-line to simplify the metrology system, and increase immunity from environmental influences.

In accordance with the foregoing objects, the present invention is a laser ranging system with sub-micron accuracy using a swept frequency laser metrology system. A common-path heterodyne interferometer with a calibrated delay-line is used as an absolute reference for the ranging system. In operation, the metrology system uses the two laser heterodyne interferometers to create two laser beams at two different frequencies to measure distance and motions of target(s). Heterodyne fringes generated from reflections off a reference fiducial $X_R$ and measurement (or target) fiducial $X_M$ are reflected back and are then detected by photodiodes. $\Delta\phi_R$ and $\Delta\phi_m$ are the measured phase changes resulted from the laser frequency swept, and the phase changes between the two signals $\Delta\phi_R$ and $\Delta\phi_m$ gives target position. The reference delay-line is the only absolute reference needed in the metrology system and can be made of ultra-low thermal expansion materials such as Zerodur and ULE to provide a ultra-stable reference.

An exemplary calibration approach for calibrating the reference delay-line is also disclosed.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a laser ranging system that employs a swept frequency laser, and multiple common-path heterodyne interferometers one with a calibrated delay-line used as an absolute reference for the ranging system. This reference delay-line is the only absolute reference needed in the metrology system.

Figure 1:
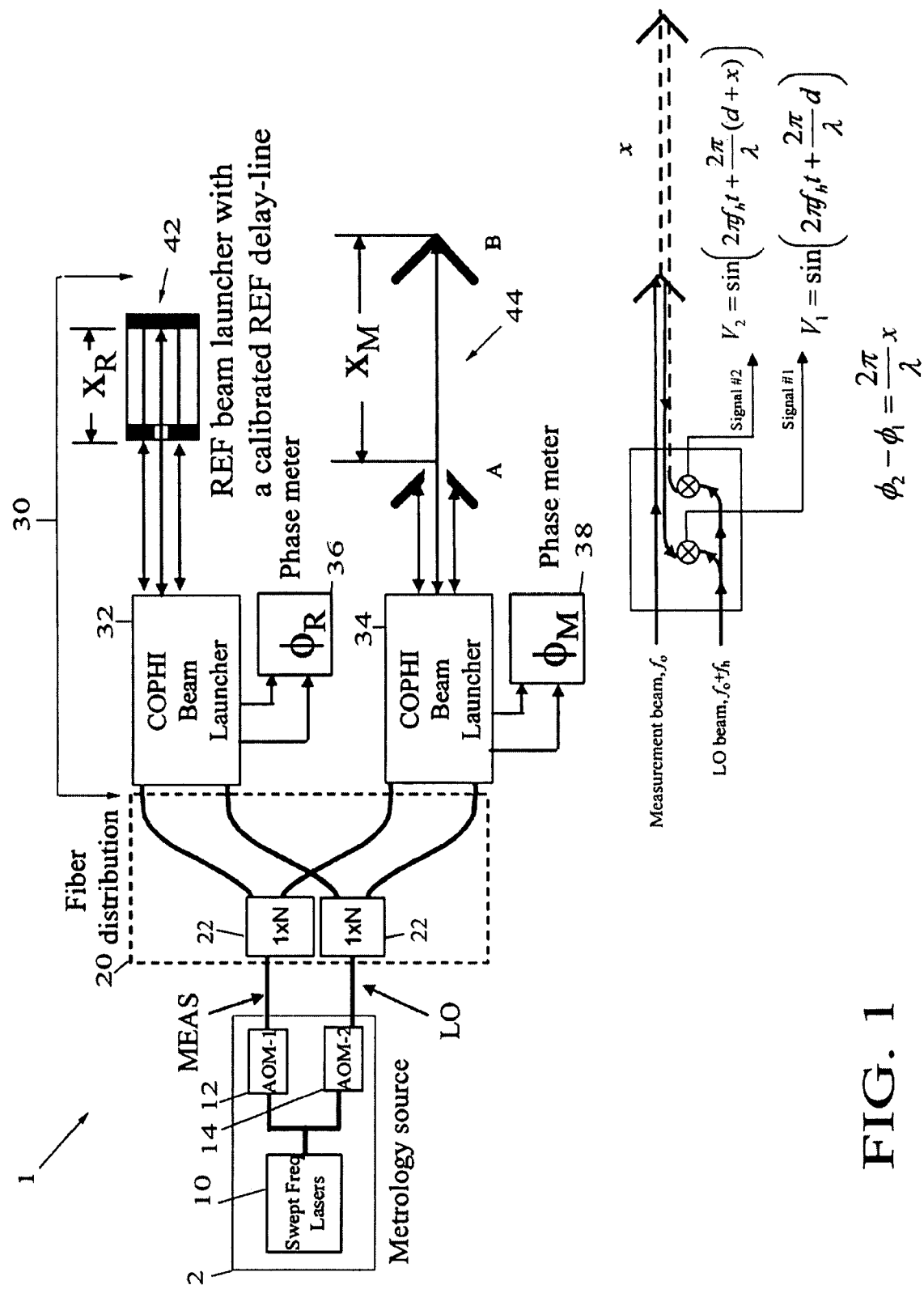
FIG. 1 is a functional block diagram of the metrology system 1 according to the present invention.

FIG. 1 is a functional block diagram of the metrology system 1, which comprises an optical platform and electronic platform. The optics include a metrology source 2 and a fiber distribution network 20. The metrology source 2 further comprises a widely tuneable, swept-frequency laser 10 and a pair of acousto-optic modulators(AOMs) 12, 14. A variety of commercial swept-frequency lasers are suitable for this purpose, including those available from NewFocus(tm), Thorlabs(tm), and iolon Inc.(tm). Likewise, a variety of commercial AOMs are suitable for this purpose, including those available from Brimrose(tm) and. IntraAction(tm).

The laser 10 output is split (by .a bifurcated optical fiber or otherwise), and the split output signal is fed into the two acousto-optic modulators(AOMs) 12, 14. The AOMs 12, 14 frequency-shift the laser output signals by a pre-determined amount to produce two heterodyne laser beams (MEAS and LO) which are offset in frequency to slightly different frequencies. The heterodyne beams (MEAS & LO) output from the AOM's 12, 14 are then split by a Fiber Distribution network 20 to an interferometer array 30.

The Fiber Distribution network 20 comprises a number of 1×N fiber optic splitters 22 which transmit both MEAS and LO beams to each of the two-or-more beam launchers (described below) in the electronics platform 30.

For each beam launcher 32, 34 the. MEAS frequency-offset laser beam (the "measurement beam") is used to interrogate the distance to a set of fiducials while the second frequency-offset laser beam (the "local oscillator" or LO) beam remains internal to the beam launcher.

More specifically, the electronics platform 30 comprises a number (here two) of "common path heterodyne interferometers" (CoPHI) here being referred to as "beam launchers" 32, 34, optically coupled to a corresponding set of fiducials 42, 44. One CoPHI interferometer 32 uses both the MEAS and LO laser beams to interrogate the positioning of a set of reference fiducials $X_R$ while the second CoPHI interferometer 34 is used to interrogate the positioning of an unknown (measured) set of reference fiducials $X_M$.

The distance $X_R$ of the reference delay-line 42 is pre-calibrated to a high accuracy and is used by the first beam launcher 32, and hence beam launcher 32 is the reference (REF) beam launcher. Beam launcher 34 is the unknown (UNK) beam launcher notably situated outside of its metrology fiducials $X_M$ for measuring the distance between point A and point B. The calibrated reference delay line 42 comprises two optical-grade mirrors held with a stable spacer to interpose a known distance $X_R$ between them, thereby forming a calibrated reference delay.

In order to measure the phase changes from the laser frequency swept, the interferometer array 30 also comprises a number of phase meters 36, 38 each in communication with a respective beam launcher 32,34 and each used to measure phase between the fringes in each beam launcher 32, 34.

In operation, the above-described metrology system 1 uses the two laser heterodyne interferometers 32, 34 to create two laser beams at two different frequencies to measure distance and motions of target(s). Heterodyne fringes generated from reflections off the fiducials $X_R$ and $X_M$ are reflected back to beam launchers 32, 34 where they are then detected by photodiodes. Here $X_R$ is the reference delay-line length, $x_M$ is the unknown distance, and $\Delta\phi_R$ and $\Delta\phi_m$ are the measured phase changes resulted from the laser frequency swept. The phase changes $\Delta\phi_m/\Delta\phi_R$ between the two beat signals can be calculated (as described below) and give the target MEAS distance $X_M$, as shown conceptually at the bottom inset of FIG. 1.

Figure 2:
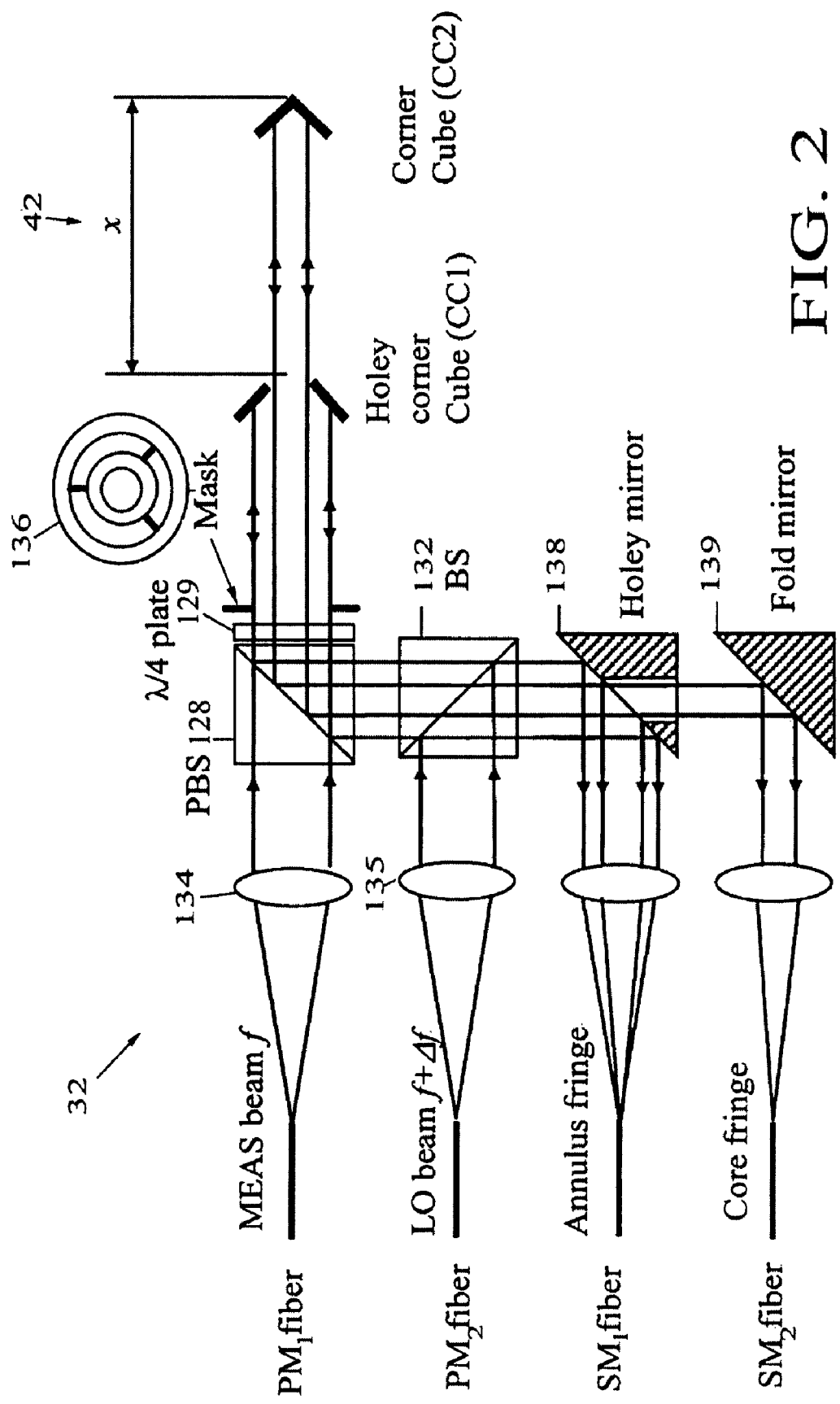
FIG. 2 is a functional diagram showing the optical layout of an exemplary CoPHI interferometer 32, 34 as used in FIG. 1.

FIG. 2 is a functional diagram showing the optical layout of an exemplary CoPHI interferometer 32, 34 as used in FIG. 1. The two heterodyne laser beams (MEAS and LO) are offset in frequency by $\Delta f$ and the two optical frequencies MEAS=f and LO=f+$\Delta f$ from the metrology source 2 are delivered with two polarization-maintaining (PM) optical fibers $PM_1$, $PM_2$ to both beam launchers 32, 34. The two optical beams denoted as measurement (MEAS) and local oscillator (LO), respectively, are then collimated at collimating lenses 134, 135 (any parabolic convex collimating lenses). The MEAS beam is pointed to the calibrated reference fiducials.

The collimated optical beam (MEAS) is split by a polarizing beam splitter (PBS) 128 and is transmitted to a first fiducial (CC1) via a quarter-wave ($\lambda/4$) plate 129 and through a mask 136.

The reflection from PBS 128 is transmitted to a beam splitter 132 and on to a holey mirror 138 and fold mirror 139 as will be described.

The mask 136 is used to provide a guard band between core and annulus fringes to reduce diffraction leakage. The mask 136 is simply a plate containing an aperture to lower edge-leakage.

The first fiducial (CC1) is a Holey corner cube (right angle corner mirror with core drilled out) to let the center portion of the MEAS beam pass through, to thereby hit a second corner cube (CC2).

Two reflected beams, including the annulus beam from CC1 and core beam from CC2,then return to the beam launcher 32. Both returned beams interfere with the second frequency, the LO beam, to produce an annulus fringe and a core fringe.

These interference fringes (both annulus fringe and core fringe) are then spatially separated by, for example, a holey mirror 138 and fold mirror 139 as shown, and are focused into two receiving SM optical fibers $SM_1$ and $SM_2$, which are connected back to the phase meters 36, 38 ($\phi_R$ and $\phi_M$) as seen in FIG. 1 for the detection of the respective heterodyne signal phases $\phi_1$ and $\phi_2$.

The fringe phase detected in each COPHI beam launcher 32, 34 can be written as $$\phi=\phi_1-\phi_2=4\pi x/\lambda=4\pi f_o x/c, \qquad [1]$$

where x is the distance between the fiducials, $\lambda$ and $f_o$ are the laser wavelength and frequency, respectively.

If a tuneable laser is used, as illustrated in FIG. 1, then the phase changes due to frequency sweep $\Delta f_o$ in both the reference (REF) and unknown (UNK) beam launchers are:

$$\Delta\phi_R=4\pi/c\,(X_r\delta f_o) \qquad [2]$$

$$\Delta\phi_m=4\pi/c\,(X_m\delta f_o) \qquad [3]$$

where $x_R$ is the reference delay-line length, $x_M$ is the unknown distance, and $\Delta\phi_R$ and $\Delta\phi_m$ are the measured phase changes resulted from the laser frequency swept. Note the phase change resulted from frequency sweep is proportional to the length between the two fiducials.

The unknown distance $x_M$ can be calculated by taking the ratio of equations [2] and [3]:

$$X_M = X_R \Delta\phi_m/\Delta\phi_R \qquad [4]$$

From Equation [4], it is obvious that $X_R$ is the only quantity that needs to be calibrated in the metrology system 1.

If desired, a set of data points $X_R$ can then be filtered using a least-square fit to remove random errors such as vibrations.

One apparent advantage of the proposed metrology system is that it does not have ambiguity in its distance measurement. This is because the measured phase change is directly proportional to the distance under measurement (Equations [1] and [2]).

Additional advantages include that the system can be used in both absolute mode and relative (displacement measuring) mode. The former is achieved by tuning the laser frequency. The latter is accomplished by using the laser in stationary mode. In the relative mode, since the REF delay-line is constant in length, the measured phase from the REF channel can be used to calculate the laser frequency drift, as shown in Equation [2]. The measured frequency drift can then be applied to the UNK channel to correct for the phase errors resulted from the frequency drift.

Figure 3:
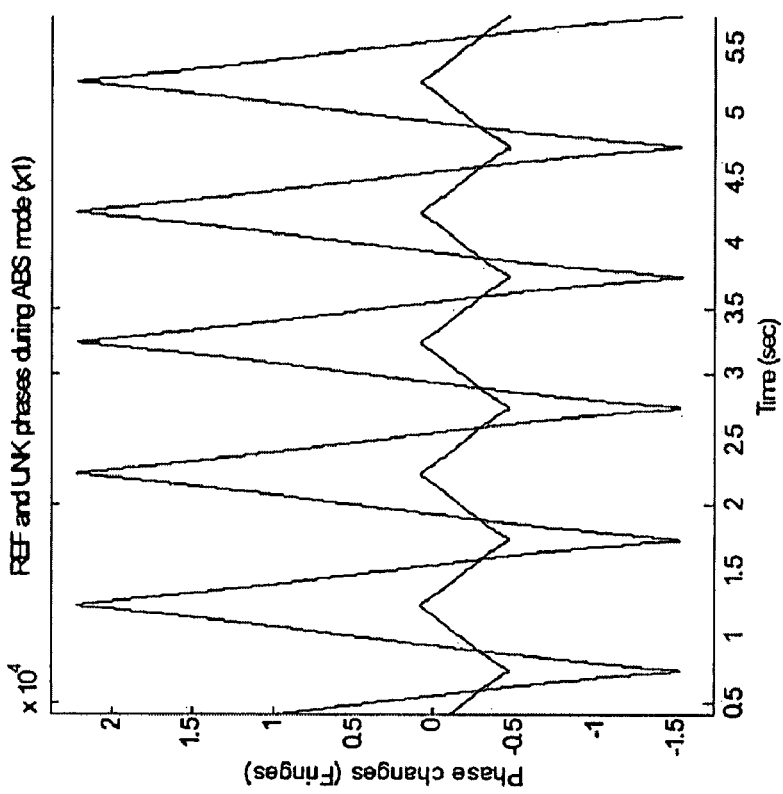
FIG. 3 shows phase changes from REF and UNK beam launchers during the absolute mode using a triangle-shaped laser frequency sweep.

FIG. 3 shows phase changes from REF and UNK beam launchers during the absolute mode using a triangle-shaped laser frequency sweep. The smaller curve is from the REF beam launcher 32 (~0.2 m), and the larger curve is from the UNK beam launcher 34 (~1 m).

Figure 4:
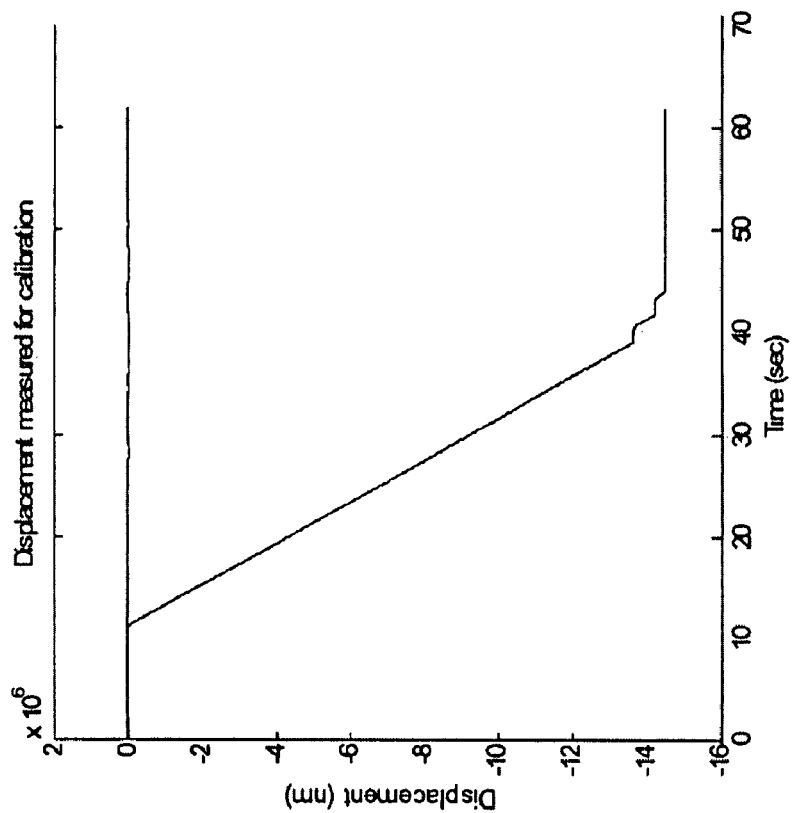
FIG. 4 shows the phase measurement during the relative mode where the laser frequency is stationary (top curve is from the REF beam launcher 32, while the lower curve is from the UNK beam launcher 34).

FIG. 4 shows the phase measurement during the relative mode where the laser frequency is stationary. The top curve is from the REF beam launcher 32, while the lower curve is from the UNK beam launcher 34 showing the displacement of the corner cube (~15 mm).

Figure 5:
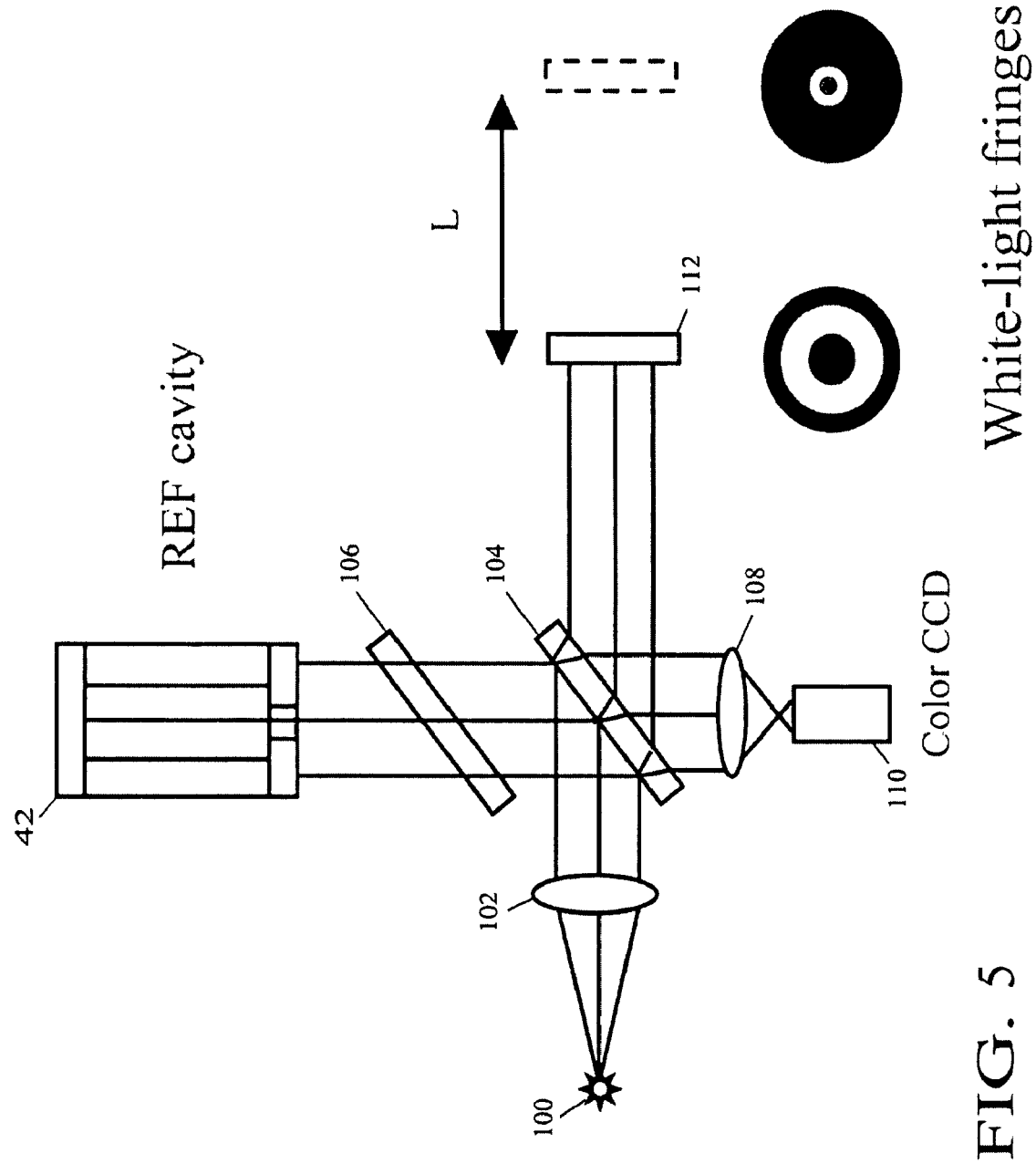
FIG. 5 is a calibration setup using a white-light Michelson interferometer to calibrate the length of the REF delay-line 42.

Several methods can be used to calibate the length of the REF delay-line 42. For example, a conventional white-light Michelson interferometer setup can be employed as shown in FIG. 5. The configuration shown in FIG. 5 utilizes a two-beam Michelson interferometer with a tungsten halogen lamp 100 as the light source. The REF delay-line cavity 42 is placed along one arm. Light from the lamp 100 is propagated through a collimating lens 102 to a beamsplitter 104, and the upwardly-reflected beam passes through a compensator plate 106 to the REF delay-line cavity 42. A mirror 112 is mounted atop a linear translation stage in the other arm. Light is refracted to the mirror 112 and is reflected back where it interferes with light returning from the REF delay-line cavity 42. The combined beam is focussed by lens 108 to a color charge-coupled device (CCD) 110. Interference fringes may be observed at the CCD 110. The user simply measures the displacement L of the mirror 112 between two white-light fringes to determine the length of the REF delay-line 42, and the procedure can be repeated as desired to calibrate the REF delay-line 42.

We have demonstrated a laser metrology system which can perform both absolute ranging measurement and displacement measurement. This metrology system has the advantage of no ambiguity in absolute ranging. Common-path heterodyne interferometer using a calibrated reference delay-line greatly simplifies the metrology system 1. The reference delay-line 42 made from highly thermally stable materials such as ULE makes the system less immune to environmental influences.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method of interferometric metrology, comprising the steps of:
    producing a reference beam of laser radiation using a first common-path heterodyne interferometer consisting of a single beam of laser radiation from the first common-path heterodyne interferometer;
    producing a measurement beam of laser radiation using a second common-path heterodyne interferometer;
    directing said reference beam of radiation to a calibrated REF delay-line for use as an absolute reference;
    directing said measurement beam of radiation to a target fiducial; and
    receiving a reflected beam of radiation from said calibrated REF delay line and from said target fiducial;
    comparing phase changes between the two received radiation beams to determine a position of said target fiducial.

2. The method of interferometric metrology according to claim 1, wherein said measurement beam of laser radiation is a swept frequency beam.

3. The method of interferometric metrology according to claim 1, wherein said comparing step further comprises applying a least-square fit to remove random errors such as vibrations.

4. The method of interferometric metrology according to claim 1, wherein calibration of the calibrated REF delay line comprises use of a white-light Michelson interferometor.

\* \* \* \* \*